Jan. 7, 1958 A. H. B. WALKER 2,819,444
MAGNETIC DISCRIMINATOR

Filed Nov. 18, 1954 2 Sheets-Sheet 1

INVENTOR
ALEC HERVEY BENNETT WALKER,

BY Robert B. [signature]
ATTORNEY

United States Patent Office 2,819,444
Patented Jan. 7, 1958

2,819,444

MAGNETIC DISCRIMINATOR

Alec Hervey Bennett Walker, London, England, assignor to Westinghouse Brake & Signal Company Limited, London, England Application November 18, 1954, Serial No. 469,693

Claims priority, application Great Britain December 18, 1953

7 Claims. (Cl. 323—92)

This invention relates to electric control apparatus of the kind generally known in the art as a magnetic discriminator, consisting of a reference core member to which a constant magneto-motive force is applied and a control core member to which a control magneto-motive force is applied, said core members being magnetically interconnected by means of yoke members to form an outer closed magnetic circuit in which said magneto-motive forces assist each other, said yoke members being bridged by an inner closed magnetic circuit through which an out-of-balance of error flux flows when said magneto-motive forces are unequal, said inner closed magnetic circuit having wound upon it a detector winding, with or without a bias winding, and said error flux being effective to determine the impedance of said detector winding in known manner. The inner closed magnetic circuit, together with the winding or windings mounted thereon, is hereinafter referred to as the detector.

Apparatus of the above kind can be designed to detect very small variations from a desired standard of a current or voltage, for example, the magnitude of which it is desired to control and, for efficient and sensitive operation, it is desirable that the inner closed magnetic circuit of the detector be composed of a number of thin laminations of suitable magnetic material and that the detector windings thereon be wound with fine guage wire. The detector is accordingly small and delicate and care must be taken, when assembling the complete discriminator, to ensure that, while being securely mounted and positively located in position, it is not subjected to excessive mechanical stress nor damaged through careless handling. Care must also be taken to ensure that no relative movement is possible, after assembly, between the detector and the outer closed magnetic circuit of the discriminator because such movement, even though very small, seriously affects the characteristics of the discriminator.

According to the invention, in electric control apparatus of the kind described, the detector is constructed as a separate unit and is cast in a suitable plastic insulating material prior to being assembled with the outer closed magnetic circuit of the discriminator.

A detector according to the invention has the advantage that it forms a unit which may be conveniently and safely handled without damage and which may be accurately and securely positioned in relation to the outer closed magnetic circuit of the discriminator. Preferably the material in which the detector is cast is one of those known in the art as "potting compounds" or "casting compounds," such as a thermo-setting resin, but the term "plastic" is intended to include both thermo-plastic and thermo-setting and any such plastic insulating material which preferably has the property of bonding to metal surfaces may be employed.

The assembled detector may be cast in the hot setting resin known as Araldite (registered trademark) casting Resin B with a suitable hardener.

One problem which arises in connection with the casting process is that of releasing the casting from the mould when the latter is made of metal owing to the property of bonding to metal surfaces which is preferably a feature of the casting compounds which may be used. The surfaces of the metal mould which come into contact with the casting compound must accordingly be coated with a suitable release agent such as silicone wax.

The mould may be made of sheet metal and so constructed that it can be completely dismantled, the component parts being secured together by means of suitable screws or bolts. The mould may be made of brass but difficulty may be experienced in completely preventing the adhesion of the casting compound to parts of the mould, in spite of the use of a release agent, and aluminium has been found to be superior in this respect, little or no difficulty being experienced in parting the sections of the mould from the casting.

It is desirable to leave free of the casting compound those surfaces of the inner closed magnetic circuit of the detector which have to be engaged by the core members in the complete discriminator and the mould may accordingly be provided with suitable inwardly projections which serve the double purpose of keeping the aforementioned surfaces free from the casting compound and, at the same time, correctly locating the detector within the mould. This also results in the formation of two recesses in the potting compound into which the yoke members fit and locate the detector in its correct position in the complete discriminator.

It may be found that, in order to obtain good magnetic joints between the inner closed magnetic circuit and the yoke members, it is necessary to skim the aforesaid protected surfaces after removing the detector from the mould, in which case care should be taken to ensure that the tool used is sharp and that only light cuts are taken, in order to avoid excessive stress in the laminations of the detector core.

One embodiment of the invention will now be described, by way of example, with reference to the accompanying drawings of which:

Figure 1:
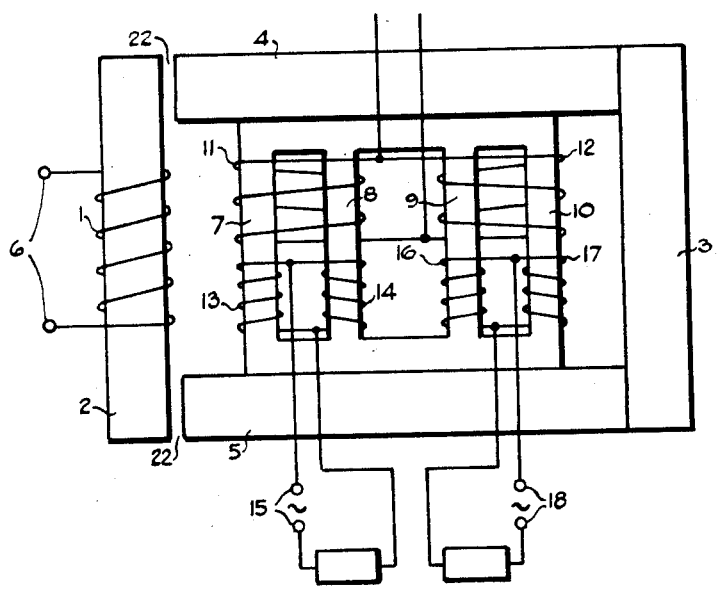
Figure 1 shows schematically the arrangement of the complete discriminator.

As shown in Figure 1, the control winding 1 is mounted on a control core member 2 which, with a permanent magnet 3 and two yokes 4 and 5, forms an outer closed magnetic circuit having two small air gaps 22, a unidirectional source of potential (not shown) being connected across the terminals 6 of the control winding to produce in the outer closed magnetic circuit a magneto-motive force which assists that of the magnet. An inner closed magnetic circuit arranged to bridge the outer closed magnetic circuit comprises a first limb formed by a first pair of parallel arms 7 and 8 and a second limb formed by a second pair of parallel arms 9 and 10, the arrangement being such that in the event of an inequality between the flux due to the magneto-motive force of the control winding and that due to the permanent magnet a resultant or error flux flows in the same direction through all the arms, the direction of flow depending on whether the flux due to the magneto-motive force of the control winding is greater or less than that due to the magneto-motive force of the permanent magnet.

Bias windings 11 and 12 are mounted on the first and second pair of arms respectively and arranged in such a way that, when supplied with direct current, bias flux of equal magnitude flows in opposite directions in each pair of arms and circulates in the inner closed magnetic circuit.

On each limb is mounted a detector winding comprising two coils, one on each arm of the limb. The two detector coils 13 and 14 associated with the first pair of arms are oppositely connected in parallel with each other and in series with a first alternating current source which is connected to terminals 15. Similarly the coils 16 and 17 of the detector winding associated with the second pair of arms are oppositely connected in parallel with each other and in series with a second alternating current source which is connected to terminals 18.

Figure 2:
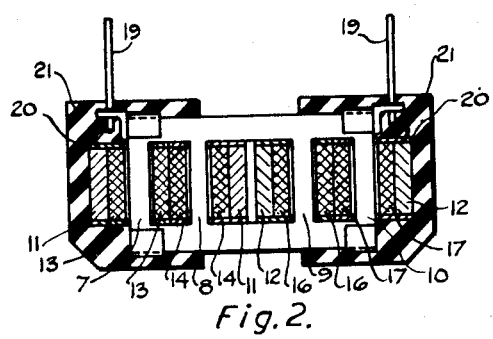
Figure 2 shows a section through a detector according to the invention.
Figure 3:
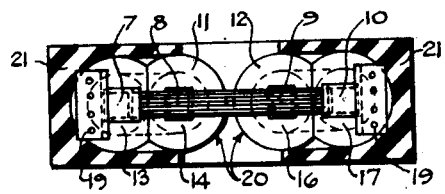
Figure 3 shows a plan view of the detector.

The detector coils and bias windings are wound, as shown in Figures 2 and 3, on bobbins 20 and their ends are connected to terminals 19, the bias winding 11 being wound upon detector coils 13 and 14 and the bias winding 12 being wound upon detector coils 16 and 17. The terminals 19 are held in position by means of the block of insulating material 21 which is cast upon each end of the detector.

The blocks of insulating material 21 are formed by mounting the detector within an aluminum frame, the frame being provided with projections which abut against those portions of the inner closed magnetic circuit which are not required to be covered with insulating material. These projections are tapered in order to facilitate removal of the frame after forming the blocks. The frame is formed of plates which can be bolted together and it is coated internally, before assembly, with a silicone wax to prevent the insulating material sticking to the frame. The frame is then filled with insulating material of the kind sold under the registered trademark "Araldite" and described as "Casting Resin B" and the blocks are formed by heat treatment in known manner. After forming the blocks the frame is removed and the portions of the inner closed magnetic circuit which are required to make contact with the outer closed magnetic circuit are skimmed with a sharp file, using light strokes so as not to damage the magnetic properties of the material of the magnetic circuit.

Figure 4:
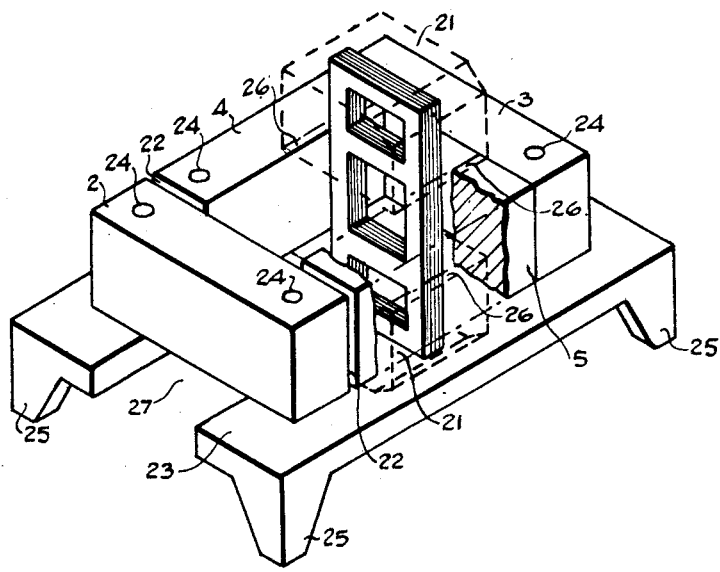
Figure 4 is an isometric view showing the detector and the yoke members in their correct relative positions after assembly. In each of the figures the same component is indicated by the same reference numeral.

The outer closed magnetic circuit comprising the control core member 2, permanent magnet 3 and the two yokes 4 and 5 is mounted, as shown in Figure 4, upon a machined brass bed plate 23 by means of screws 24, the bed plate being supported by means of feet 25 cast integral with the plate. In this figure the blocks of insulating material 21 are shown dotted so as not to obscure the inner closed magnetic circuit of the detector. The blocks have faces 26 which engage the upper and lower faces of yokes 4 and 5, thereby preventing relative movement in a vertical direction between the detector and the outer closed magnetic circuit. A slot 27 in the base plate 23 allows the control winding 1 to be mounted upon the member 2, the slot having an enlarged portion (not shown) which embraces the lower block 21 thereby preventing relative movement in a horizontal direction between the detector and the outer closed magnetic circuit. The air gaps 22 are arranged to have a convenient length by interposing brass washers between the member 2 and the yokes 4 and 5.

It is to be understood that any suitable non-magnetic material may be used instead of the brass plate. It is also to be understood that the invention is not limited in application to the discriminator particularly described above. It may, for example, be incorporated in a discriminator having some other means for providing the substantially constant magnetomotive force.

Having thus described my invention what I claim is:

1. A magnetic discriminator comprising, in combination, an outer closed magnetic circuit, a detector having an inner closed magnetic circuit, plastic insulating material partially covering said detector, faces on said inner closed magnetic circuit said faces being free from said plastic insulating material and abutting said outer closed magnetic circuit whereby said inner closed magnetic circuit bridges said outer closed magnetic circuit, and faces on said plastic insulating material abutting said outer closed magnetic circuit to locate said detector relatively to said outer closed magnetic circuit.

2. A magnetic discriminator comprising, in combination, an outer closed magnetic circuit, a detector having an inner closed magnetic circuit, blocks of plastic insulating material partially covering said detector, faces on said inner closed magnetic circuit said faces being free from said plastic insulating material and abutting said outer closed magnetic circuit whereby said inner closed magnetic circuit bridges said outer closed magnetic circuit, and faces on each of said blocks abutting said outer closed magnetic circuit to prevent relative movement in one direction between said detector and said outer closed magnetic circuit.

3. A magnetic discriminator comprising, in combination, a non-magnetic base plate, a slot in said base plate said slot having sides, an outer closed magnetic circuit secured to said base plate, a detector having an inner closed magnetic circuit, blocks of plastic insulating material partially covering said detector, faces on said inner closed magnetic circuit said faces being free from said plastic insulating material and abutting said outer closed magnetic circuit to prevent relative movement in one direction between said detector and said outer closed magnetic circuit, and other faces on one of said blocks said other faces abutting said sides of said slot to prevent relative movement in a direction perpendicular to said one direction between said detector and said outer closed magnetic circuit.

4. A magnetic discriminator comprising, in combination, an outer closed magnetic circuit, means for applying to said outer closed magnetic circuit a constant uni-directional magnetomotive force, means for applying to said outer closed magnetic circuit a control magneto-motive force assisting said constant uni-directional magneto-motive force and thereby producing an error flux, a detector having an inner closed magnetic circuit, faces on said inner closed magnetic circuit said faces being free from said plastic insulating material and abutting said outer closed magnetic circuit whereby said inner closed magnetic circuit bridges said outer closed magnetic circuit and provides a path for said error flux, blocks of plastic insulating material partially covering said detector, and faces on each of said blocks abutting said outer closed magnetic circuit to locate said detector relatively to said outer closed magnetic circuit.

5. A magnetic discriminator comprising, in combination, a non-magnetic base plate, a slot in said base plate said slot having sides, an outer closed magnetic circuit secured to said base plate, means for applying to said outer closed magnetic circuit a constant uni-directional magneto-motive force, means for applying to said outer closed magnetic circuit a control magneto-motive force assisting said constant uni-directional magneto-motive force and thereby producing an error flux, a detector having an inner closed magnetic circuit, faces on said inner closed magnetic circuit said faces being free from said plastic insulating material and abutting said outer closed magnetic circuit whereby said inner closed magnetic circuit bridges said outer closed magnetic circuit and provides a path for said error flux, blocks of plastic insulating material partially covering said detector, faces on each of said blocks abutting said outer closed magnetic circuit to prevent relative movement in one direction between said detector and said outer closed magnetic circuit and other faces on one of said blocks said other faces abutting said sides of said slot to prevent relative movement in a direction perpendicular to said one direction between said detector and said outer closed magnetic circuit.

6. A magnetic discriminator comprising, in combination, an outer closed magnetic circuit consisting of a permanent magnet and a control core member magnetically connected in parallel by means of two yoke members, said permanent magnet providing a constant uni-directional magneto-motive force, means for applying to said control core member a control magneto-motive force assisting said constant uni-directional magneto-motive force and thereby producing an error flux, a detector having an inner closed magnetic circuit, two faces on said inner closed magnetic circuit said faces being free from said plastic insulating material and respectively abutting one of said yoke members whereby said inner closed magnetic circuit bridges said yoke members and provides a path for said error flux, blocks of plastic insulating material partially covering said detector and faces on each of said blocks abutting said yoke members to locate said detector relatively to said outer closed magnetic circuit.

7. A magnetic discriminator comprising, in combination, a non-magnetic base plate, a slot in said base plate said slot having, an outer closed magnetic circuit consisting of a permanent magnet and a control core member magnetically connected in parallel by means of two yoke members, said permanent magnet providing a constant uni-directional magneto-motive force, said permanent magnet, control core member and yokes being secured to said base plate, means for applying to said control core member a control magneto-motive force assisting said constant uni-directional magneto-motive force and thereby producing an error flux, a detector having an inner closed magnetic circuit, two faces on said inner closed magnetic circuit said faces being free from said plastic insulating material and respectively abutting one of said yoke members whereby said inner closed magnetic circuit bridges said yoke members and provides a path for said error flux, two blocks of plastic insulating material partially covering said detector, faces on each of said blocks said faces on one block abutting one said yoke member and said faces on the other block abutting the other said yoke member to prevent relative movement in one direction between said detector and said yoke members and other faces on one of said blocks said other faces abutting said sides of said slot to prevent relative movement in a direction perpendicular to said one direction between said detector and said yoke members.

References Cited in the file of this patent

UNITED STATES PATENTS

| | | |
|---|---|---|
| 1,427,324 | Priestley | Aug. 29, 1922 |
| 1,796,421 | Apple | Mar. 17, 1931 |
| 2,435,062 | Walsh | Jan. 27, 1948 |